United States Patent [19]
Lopes

[11] Patent Number: 6,042,416
[45] Date of Patent: Mar. 28, 2000

[54] PROTECTIVE WEATHERPROOF BAG FOR PORTABLE STEREO

[76] Inventor: David C. Lopes, 30 Pewter Dr., Tinton Falls, N.J. 07753-7836

[21] Appl. No.: 09/073,053

[22] Filed: May 5, 1998

[51] Int. Cl.[7] ...................................................... H01R 3/00
[52] U.S. Cl. ........................ 439/500; 206/320; 224/930; 429/123; 383/66; 383/41
[58] Field of Search ............................. 439/500; 206/305, 206/320, 576, 514; 224/929, 930, 610, 613, 231, 245, 246; 429/100, 121, 123; 383/63, 66, 41, 121.1; 190/18 R, 1, 11

[56] References Cited

U.S. PATENT DOCUMENTS

| | | | |
|---|---|---|---|
| 5,090,562 | 2/1992 | Grullemans | 206/320 |
| 5,202,200 | 4/1993 | McMillan, Jr. et al. | 429/187 |
| 5,217,119 | 6/1993 | Hollingsworth | 206/583 |
| 5,277,993 | 1/1994 | Landers | 429/10 |
| 5,437,367 | 8/1995 | Martin | 206/320 |
| 5,706,940 | 1/1998 | Amarello | 206/320 |

*Primary Examiner*—Steven L. Stephan
*Assistant Examiner*—Barry M. L. Standig
*Attorney, Agent, or Firm*—Robert M. Skolnik

[57] ABSTRACT

A protective enclosure for a portable electronic radio or "boom box" includes a heavy base having legs extendible from the base so that the electronic device can be supported above the ground surface. An external battery compartment is provided in the enclosure for external batteries which are connected to a connector mounted in the internal battery compartment of the electronic device. The connector takes the place of the batteries mounted in the battery compartment. This permits batteries to be manipulated as required without the necessity of removing the electronic device from the enclosure.

6 Claims, 3 Drawing Sheets

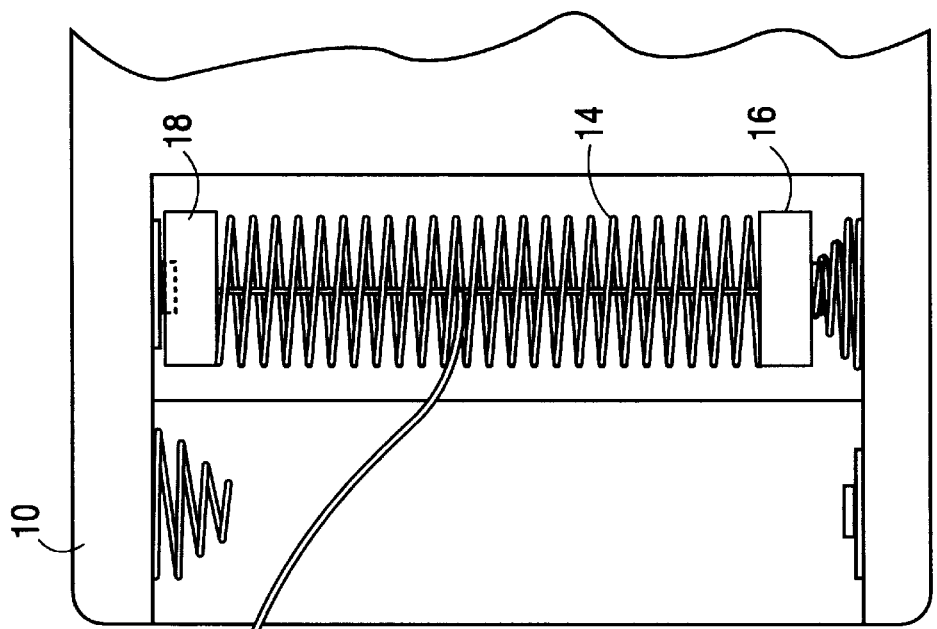
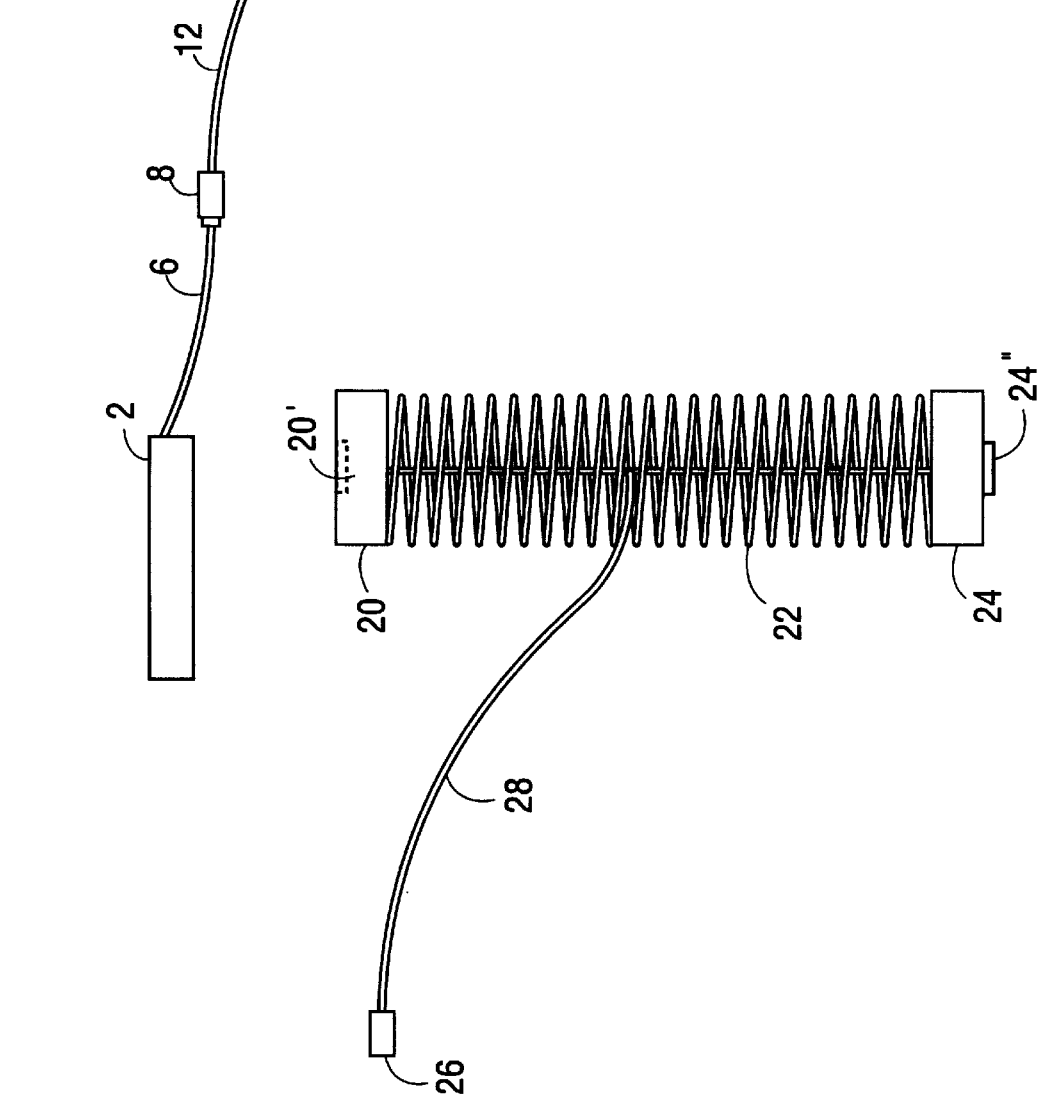

PROTECTIVE WEATHERPROOF BAG FOR PORTABLE STEREO

BACKGROUND OF THE INVENTION

1. Field of the Invention

The present invention relates to protective enclosures for portable stereos. Such devices are protected from sand and weather with an enclosure having a heavy plastic base for the bag with legs, extendible from the base to support the radio above the sand or the ground. The stereo can be attached to the base and wrap around each end of the stereo. Compartments can be provided in the enclosure for batteries, CD's, tapes, etc. The invention proposes to use an external battery in a compartment formed in the bag. A connector is used to connect the external battery to the battery compartment of the stereo. The connector is a spring loaded device which has conductive points attaching to the existing battery terminals in the compartment. A wire connects the terminals to a connector which is coupled to the external battery.

2. Description of the Prior Art

The prior art teaches several alternative bag type enclosures and supports for the enclosure.

Gerard, U.S. Pat. No. 3,506,049 shows a protective bag for large articles of furniture.

Barnard, U.S. Pat. No. 4,434,829 relates to a flexible clean up device in the from of an open ended folded bag.

Hambleton, U.S. Pat. No. 4,437,634 discloses a frame for supporting a plastic sack in place while it is being filed with groceries or other articles.

Stroh, U.S. Pat. No. 4,467,989, relates to a wire frame similar in shape to that of Hambleton.

Tamont, U.S. Pat. No. 4,880,418, is a frame for supporting a safety net.

Rudko, U.S. Pat. No. 4,921,196, discloses a frame for supporting a paper bag. The frames has a heavy base to which the wire frame supports are attached.

Hodson, U.S. Pat. No. 4,932,534, shows a computer cover which is porous, water resistant and static charge resistant. Flaps are provided to gain access to portions of the computer which require an open path.

SUMMARY OF THE INVENTION

There is a need for a protective enclosure for electronic devices such as portable radio/CD players when same are used at the beach or otherwise outside the home. One of the characteristics of such an enclosure is the ability to keep the radio/CD player in the enclosure on a permanent basis to that the inconvenience of inserting the device in the enclosure and removing same from the enclosure may be eliminated. The present invention is designed to provide such an enclosure.

The invention includes a heavy base having legs extendible from the base so that the electronic device can be supported above the ground surface. An external battery compartment is provided in the enclosure for external batteries which are connected to a connector mounted in the internal battery compartment of the electronic device. The connector takes the place of the batteries mounted in the battery compartment. This permits batteries to be manipulated as required without the necessity of removing the electronic device from the enclosure.

A principal object of the present invention is the provision of a protective enclosure for portable stereo radios, "boom" boxes, compact disc players and the like Another object and advantage of the invention is the provision of a protective enclosure in the form of a carrying bag for the electronic device. A still further object and advantage of the invention is-the provision of a carrying bag of the class described which can permanently house the electronic device. A still further object and advantage of the invention is the provision of a protective enclosure for an electronic device which does not require that the device be removed from the enclosures. Another object and advantage of the invention is the provision of a protective enclosure having a supporting base for the electronic device. A still further object and advantage of the invention is the provision of a protective enclosure where the supporting base has extendible legs to support the base and the device a desired distance above the surface on which the device is placed. A still further object and advantage of the invention is the provision of a protective enclosure having an external battery compartment formed in the enclosure. A still further object and advantage of the invention is the provision of a connector to connect the external battery in the battery compartment to the battery terminals of the electronic device. Another object and advantage of the invention is the provision of a battery connector having connections which attach to the battery terminals of the electronic device. Another object and advantage of the present invention is the provision of a battery connector which is spring loaded to fit within the battery compartment of the electronic device and to provide connectors from the battery compartment to the external battery.

BRIEF DESCRIPTION OF THE DRAWINGS

These as well as further objects and advantages of the invention will become apparent to those skilled in the art from a review of the following detailed description of my invention, reference being made to the accompanying drawings in which:

FIG. 4–5 are diagrammatic views of an attachment used with the embodiment of my invention shown in FIGS. 1–3.

DESCRIPTION OF THE PREFERRED EMBODIMENTS

Figure 1:
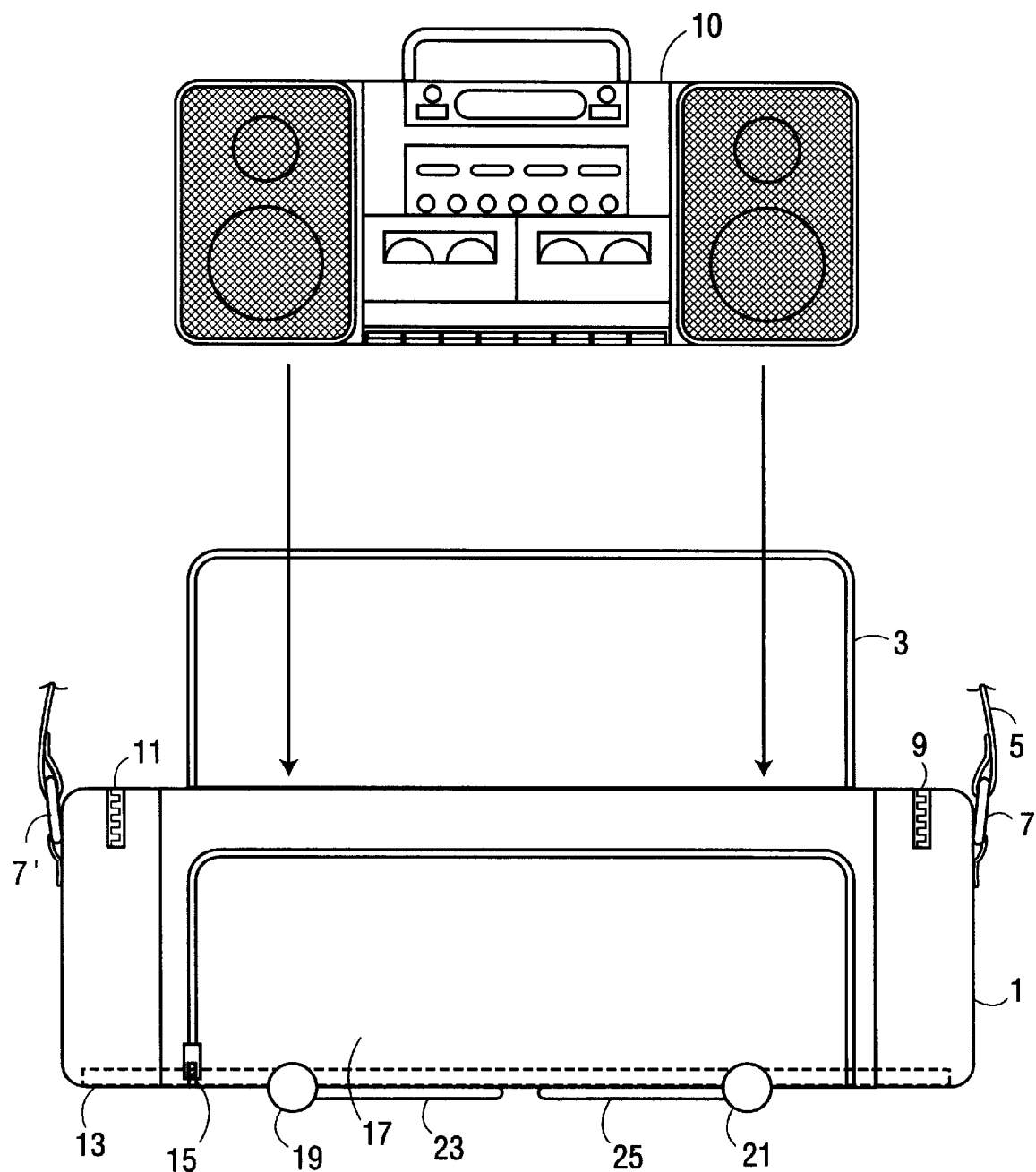
FIG. 1 is a front view of the preferred embodiment of my invention.
Figure 2:
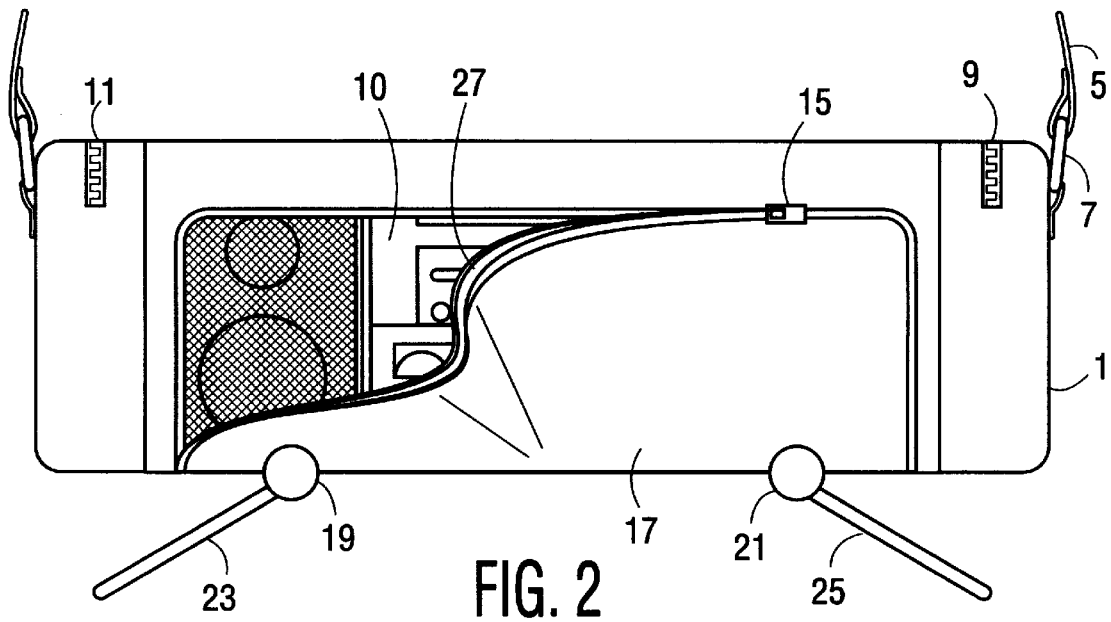
FIG. 2 is a front view of a portion of the embodiment of my invention shown in FIG. 1.
Figure 3:
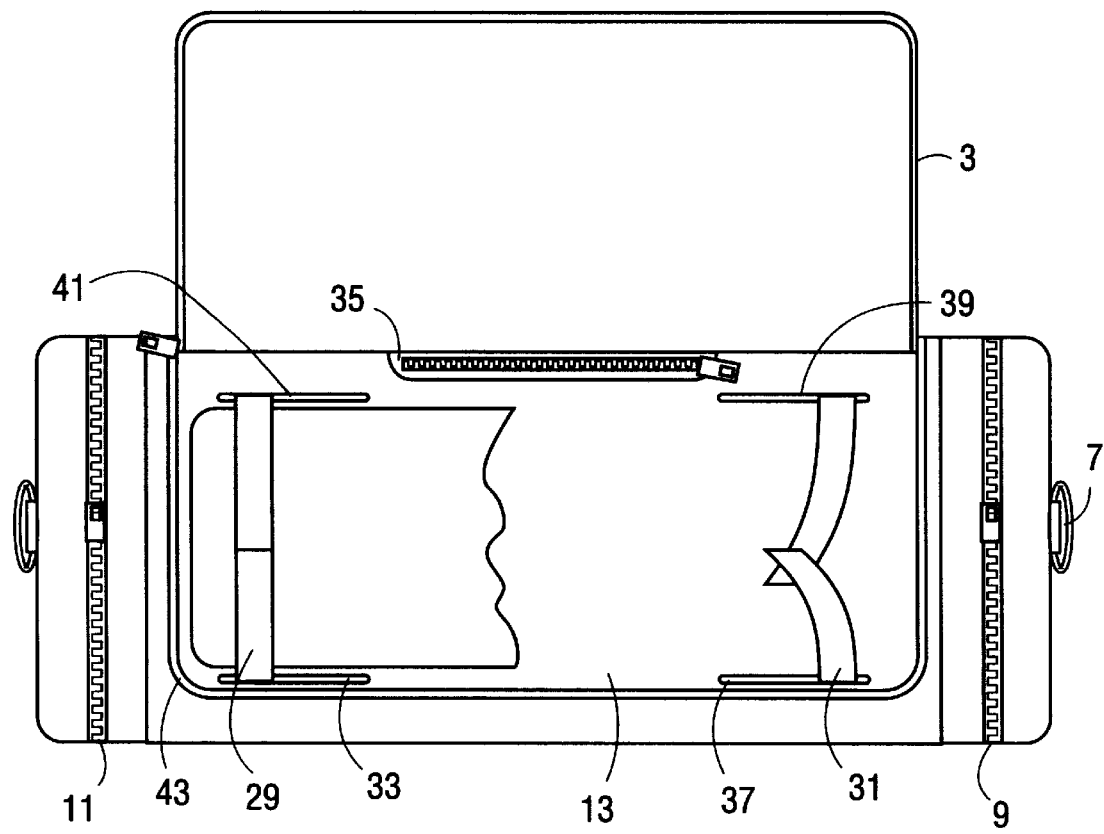
FIG. 3 is a top view of the portion of the embodiment of my invention shown in FIG. 2.

With reference to the embodiment of the invention shown in FIGS. 1–3, a portable stereo popularly known as a "boom box" 10 is inserted into a protective enclosure 1. The enclosure 1 includes a solid base 13 to which are attached two pairs of legs. A first pair of legs (one of which is shown at hinge 19 and leg 23) is foldable downwards from the position shown in FIG. 1 to the position shown in FIG. 2. A second pair of legs (one of which is shown at hinge 21 and leg 25) is also foldable downwards to the position shown in FIG. 1. In the FIG. 2 position, the legs serve to support the enclosure 1 and its contents a distance above the surface.

The bag 1 has two side compartments which are accessed by closures 9 and 11. The bag also has a top cover 3 which can be closed by closure 43 in FIG. 3. The bag also has a front cover 13 which can be closed by a closure 15. Strap 5 may be fastened to securing rings 7, 7' to support the bag and the radio on the shoulder.

As best shown in FIG. 2, the bag 1 has a second thin protective cloth 27 covering the face of the radio 10. The cloth 27 permits the cover 17 to be open so that the radio can be used. The cloth 27 protects the radio while the cover 17 is open without otherwise affecting the audio quality of the radio.

As best shown in FIG. 3, the supporting base 13 has four slots 33, 37, 39 and 41 formed therein. These slots receive a portion of straps 29 (in slots 33 and 41) and 31 (in slots 37 and 39). Straps 29 and 31 serve to hold the radio 10 onto the base 13. The slots are elongated to as to permit the straps to be used with radios of different dimensions.

Also shown in FIG. 3 is the rechargeable battery compartment 35. The function and operation of this compartment in connection with the devices shown in FIGS. 4–5 will be described later.

The legs 23, 25 may be mounted onto the base 13 by available hinges. Each pair of legs may be connected together as with a bar to provide further support for the radio when the legs are extended and to allow a user to unfold the legs in pairs instead of unfolding them individually. When the legs are in the position shown in FIG. 1, a portion of the hinge 19 and 21 extend beyond the bottom surface of the base 13 and the bag 1 so that the bag 1 can be placed on a surface and be supported by the extended portion of the hinges.

The radio 10 never needs to be taken out of the protective bag 1 of my invention. Battery power is provided by a rechargeable battery 2 which is placed in the rechargeable battery compartment 35 in electronic device 10. With reference to FIGS. 4–5, the rechargeable battery 2 is connected to the terminals of the existing battery compartment of the radio 10 using an special spring loaded electrical connector. The battery 2 is connected to a connector 8 via a conductor 6. Connector 8 is connected via wire 12 to a central conductor in a spring loaded device having central spring 14 and two conductive cylinders 16 and 18. The connector shown in FIG. 5 includes two cylinders 20, 24 having conductive points 20' and 24' on the ends thereof Each of the cylinders are connected to each other by a spring 22. An two conductor wire 28 is connected to each cylinder centrally of the spring 22 and to a connector 26. In the usual case of a radio 10 which employ four "D" size batteries, two of the spring loaded connectors is placed into the battery compartment, one connector taking the place of two batteries. The spring pressure securely holds the ends against the battery contacts provided for in the battery compartment. The spring loaded connectors are manufactured in different sizes commensurate with the dimensions of the batteries used in devices 10.

As will now be seen, further modifications to the method and apparatus of the invention may be made without departing from the spirit and scope of the invention; accordingly, what is sought to be protected is set forth in the appended claims.

I claim:

1. A protective enclosure for a battery powered portable electronic device comprising: a base; two pairs of foldable legs attached to said base for supporting said base above a surface; a weatherproof bag attached to said base, said bag having at least one storage compartment formed therein, a top cover and a front cover; strap means attached to said bag for assisting in carrying said bag; a second covering connected to said bag mounted adjacent to said front cover; said base including a plurality of slots formed therein; securing straps connected to said base in said slots for securing an electronic device to said base; a rechargeable battery compartment formed in said bag; and at least two spring loaded electrical connectors mounted in said electronic device for taking the place of batteries, said spring loaded electrical connectors being connected to said rechargeable battery compartment.

2. The protective enclosure of claim 1 wherein each of said pairs of legs are moveable from a first fully retracted position to a second fully extended position and each of said pairs of legs include means attached to said base for supporting said base above a surface when said legs are in either of said first or said second positions.

3. The protective enclosure of claim 1 wherein said spring loaded electrical connector comprises; two cylinders having conductive points on the ends thereof; a spring connected between said cylinders; and a two conductor wire connected to each cylinder centrally of said spring.

4. The protective enclosure of claim 3 wherein the force exerted by said spring securely holds said cylinders against the battery contacts provided for in said electronic device.

5. A protective enclosure for a portable electronic device having a battery compartment, said protective enclosure comprising: a base; leg means attached to said base for supporting said base above a surface; weatherproof bag means attached to said base for receiving an electronic device, means attached to said bag means for carrying said bag means; securing means connected to said base for securing said electronic device to said base; rechargeable battery means housed in said weatherproof bag means; spring-loaded electrical connection means for connection in said battery compartment for taking the place of batteries; and electrical connection means for connecting said rechargeable battery means to said spring-loaded electrical connection means.

6. The protective enclosure of claim 5 wherein said spring-loaded electrical connection means comprises; two cylinders having conductive points on the ends thereof; a spring connected between said cylinders; and a two conductor wire connected to each cylinder centrally of said spring, whereby the force exerted by said spring securely holds said cylinders against the battery contacts provided for in said electronic device.

* * * * *